(12) United States Patent
Murakami et al.

(10) Patent No.: US 7,792,761 B2
(45) Date of Patent: Sep. 7, 2010

(54) SYSTEM FOR EVALUATING RELEVANCE BETWEEN PERSONS

(75) Inventors: Akiko Murakami, Kawasaki (JP); Yuta Tsuboi, Kanagawa-ken (JP); Hideo Watanabe, Tokyo (JP); Issei Yoshida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 11/552,205

(22) Filed: Oct. 24, 2006

(65) Prior Publication Data
US 2007/0100686 A1 May 3, 2007

(30) Foreign Application Priority Data
Nov. 1, 2005 (JP) ............................. 2005-318431

(51) Int. Cl.
*G06Q 99/00* (2006.01)
(52) U.S. Cl. .................................................. 705/319
(58) Field of Classification Search ........................ None
See application file for complete search history.

(56) References Cited
U.S. PATENT DOCUMENTS
7,028,024 B1 * 4/2006 Kommers et al. ............... 707/3
7,185,065 B1 * 2/2007 Holtzman et al. ........... 709/217
2003/0187813 A1 * 10/2003 Goldman et al. ............... 707/1
2007/0033275 A1 * 2/2007 Toivonen et al. ........... 709/224

FOREIGN PATENT DOCUMENTS
JP 2005-108123 4/2005

OTHER PUBLICATIONS
Masanori Harada et al., "Finding Key People and Visualizing their Relationships in the Web," Technical Reports of Information Processing Society of Japan, vol. 2003, No. 51, Abstract.

* cited by examiner

*Primary Examiner*—John G Weiss
*Assistant Examiner*—Amanda Kirlin
(74) *Attorney, Agent, or Firm*—Gibb I.P. Law Firm, LLC

(57) ABSTRACT

Embodiments herein properly determine relevance between persons. Embodiments herein provide a system for evaluating relevance between persons, including relevance detecting means for detecting directed relevance of a person as a target to another person based on a text in which evaluations or feelings of the other person by another person is expressed; storing means for storing the detected relevance; evaluating means for evaluating, with respect to a set of a first person and second person to be evaluated, relevance between the first person and the second person based on a plurality of relevances including the stored relevances and reaching the second person from the first person via at least one further person; and outputting means for outputting the relevance evaluated.

6 Claims, 6 Drawing Sheets

| FIRST ATTRIBUTE VALUE | SECOND ATTRIBUTE VALUE | RELEVANCE | EVALUATION TIME |
|---|---|---|---|
| ABC COMPANY | XYZ ELECTRIC COMPANY | +0.5 | 2005 / 4/ 25 |
| XYZ ELECTRIC COMPANY | GDG COMMUNICATION | +0.4 | 2002 / 3/ 1 |
| ⋮ | ⋮ | ⋮ | ⋮ |

_US 7,792,761 B2_

SYSTEM FOR EVALUATING RELEVANCE BETWEEN PERSONS

FIELD OF THE INVENTION

The present invention relates to a system for evaluating relevance between persons. More specifically, the present invention relates to a system for evaluating relevance between persons based on the description of a text.

BACKGROUND OF THE INVENTION

In a marketing strategy for products and services, the acquaintance relation between persons sometimes referred to as personal connection or human network may become important. For example, when it is desired that a product or a service is purchased by a person, it is effective to have another person, who is trusted by that person, recommend to purchase the product or the service. However, acquaintance relation is not simple, and it is difficult to know a possibility that the most effective result is obtained when who gets an introduction from whom.

Conventionally, there has been proposed a technique graphically displaying relevance between persons, as a reference technique. However, according to this technique, providing the relevance between persons is effected by whether a plurality of names of persons are described in the same electronic document (text, for example) or not. Also, a node indicating a person is connected to a node indicating a person who is related to the former person by an edge. A graph created by repeating these connections is displayed for user.

SUMMARY OF THE INVENTION

However, the graph created by the above-mentioned reference technique is an undirected graph composed of undirected edges. Therefore, this graph cannot express a situation in which a person unilaterally respects another person or a situation in which a person highly appreciates a personality of another person unilaterally. Therefore, it is difficult to utilize this technique in a practical application such as a utilization for a marketing strategy.

Further, even in the case where two persons are described in the common text, there is a possibility that the two persons are in a competitive relation or have feelings of dislike with each other. In such a case, the use of the acquaintance relation for a market strategy may have an adverse effect. In this way, in the prior art, it is difficult to utilize the acquaintance relation expressed by the graph in a practical application such as a marketing strategy.

Therefore, the object of the present invention is to provide a system, a method, and a program which can solve the above-mentioned problems. This object is attained by the combinations of features described in independent claims in the scope of claims. Also, dependent claims define further advantageous specific embodiment.

For solving the above problem, the present invention provides a system for evaluating relevance between persons, including:

detecting means for detecting directed relevance of a person as a target to another person based on a text in which evaluations or feelings of the person by another person are expressed;

storing means for storing the detected relevance;

evaluating means for evaluating, with respect to a set of a first person and a second person to be evaluated, relevance between the first person and the second person based on a plurality of relevances including the detected relevances and reaching the second person from the first person via at least one further person; and outputting means for outputting the evaluated relevance.

The concept of the present invention is not the enumeration of all the necessary features of the present invention, but subcombinations of the features thereof may be also accepted as the inventions.

According to the present invention, the relevance which exists between persons can be determined properly.

DETAILED DESCRIPTION OF THE INVENTION

Hereinafter, the present invention is described through an embodiment of the present invention. The embodiment described below does not limit the scope of claims, nor may all the combinations of the characteristics described in the embodiment always be necessary as means for solving problems of the present invention.

Figure 1:
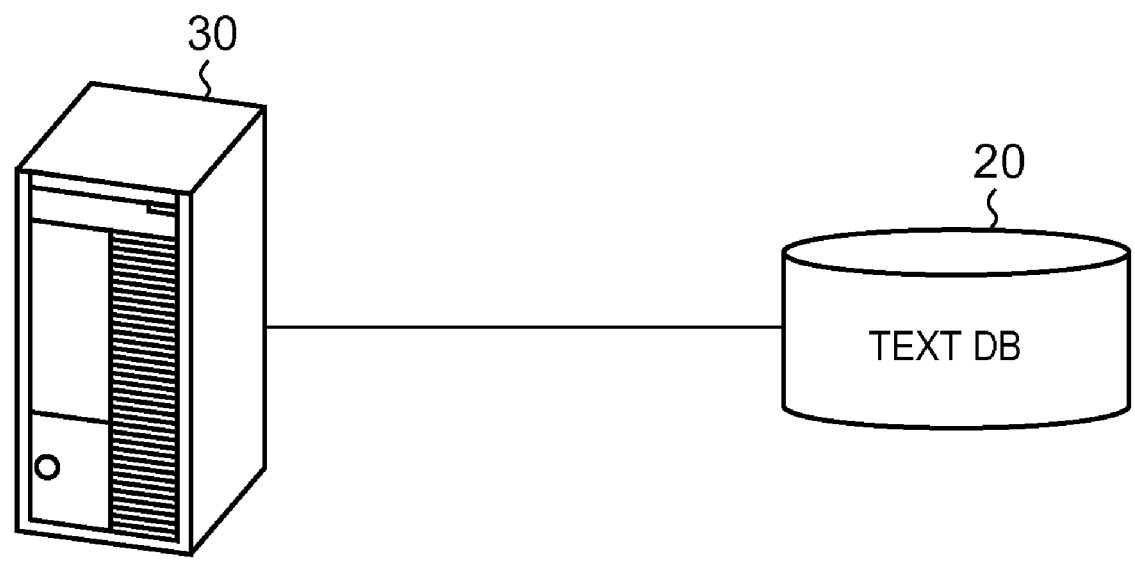
FIG. 1 shows a whole configuration of an information system 10.

FIG. 1 shows a whole configuration of the information processing system 10. The information processing system 10 includes a text database 20 and an evaluation system 30. The text database 20 stores a plurality of texts in each of which evaluations or feelings of a person as a target to another person are expressed. This text may further store information about a fact that the person and another person acted together, or an expression the person and the another person share. The evaluation system 30 evaluates directed relevance and/or undirected relevance between the person and another person based on a text stored in the text database 20.

Figure 2:
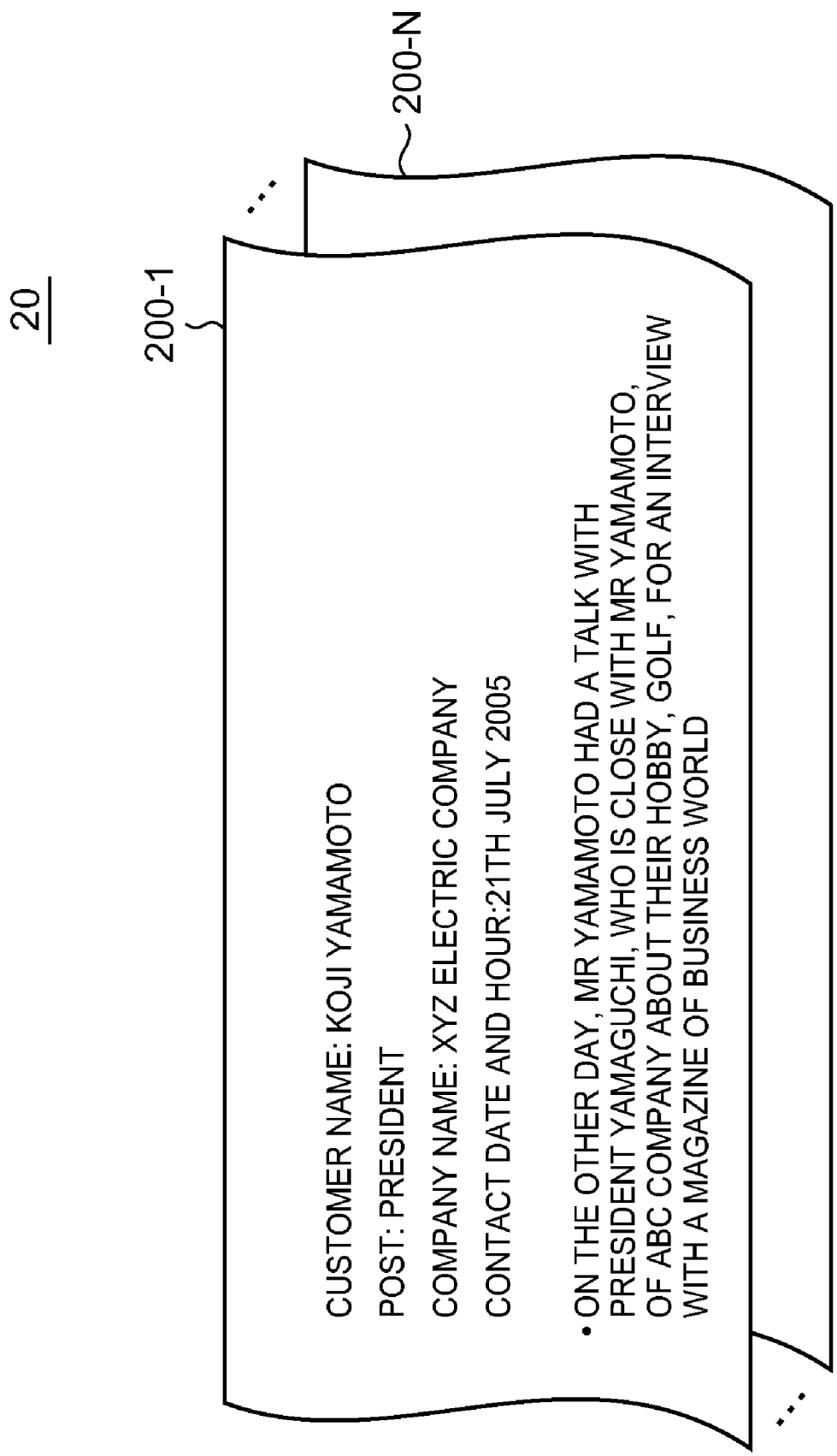
FIG. 2 shows an example of a text database 20.

FIG. 2 shows a specific example of the text database 20. The text database 20 includes a plurality of texts, for example, a text 200-1 through a text 200-N. The text stored in the text database 20 may be standard data complying with a certain format, or nonstandard data such as a memo, an electronic mail, and the like. The standard text is shown as an example in FIG. 2. A salesman of an imaginary company records information obtained from his client as the text 200-1 according to a predetermined format. The example of FIG. 2 shows that a client named Koji Yamamoto, the president of XYZ Electric Company, had a talk with President Yamaguchi of ABC Company, about their hobby, golf, for an interview with a magazine of business world. The example of FIG. 2 further shows that this information was collected on 21 of Jul. 2005.

As described above, the text 200-1 may include the expression of a fact that a person acted together with another person, such as an expression, "had a talk". The text 200-1 may also includes expressions of someone's feeling toward another person, such as "be close with (be in good term)", and the like. The evaluation system 30 according to the present embodiment evaluates relevance between persons based on the expressions. Thereby, the evaluation system 30 also aims to properly evaluate directed relevance, such as a case in which a person and another person trust each other, as well as a case in which a person respects another person unilaterally, without reciprocation. Furthermore, the evaluation system 30 also aims to properly evaluate a situation which should not be utilized, such as a case in which a person bears negative feelings toward another person, or the like.

Figures 3, 4:
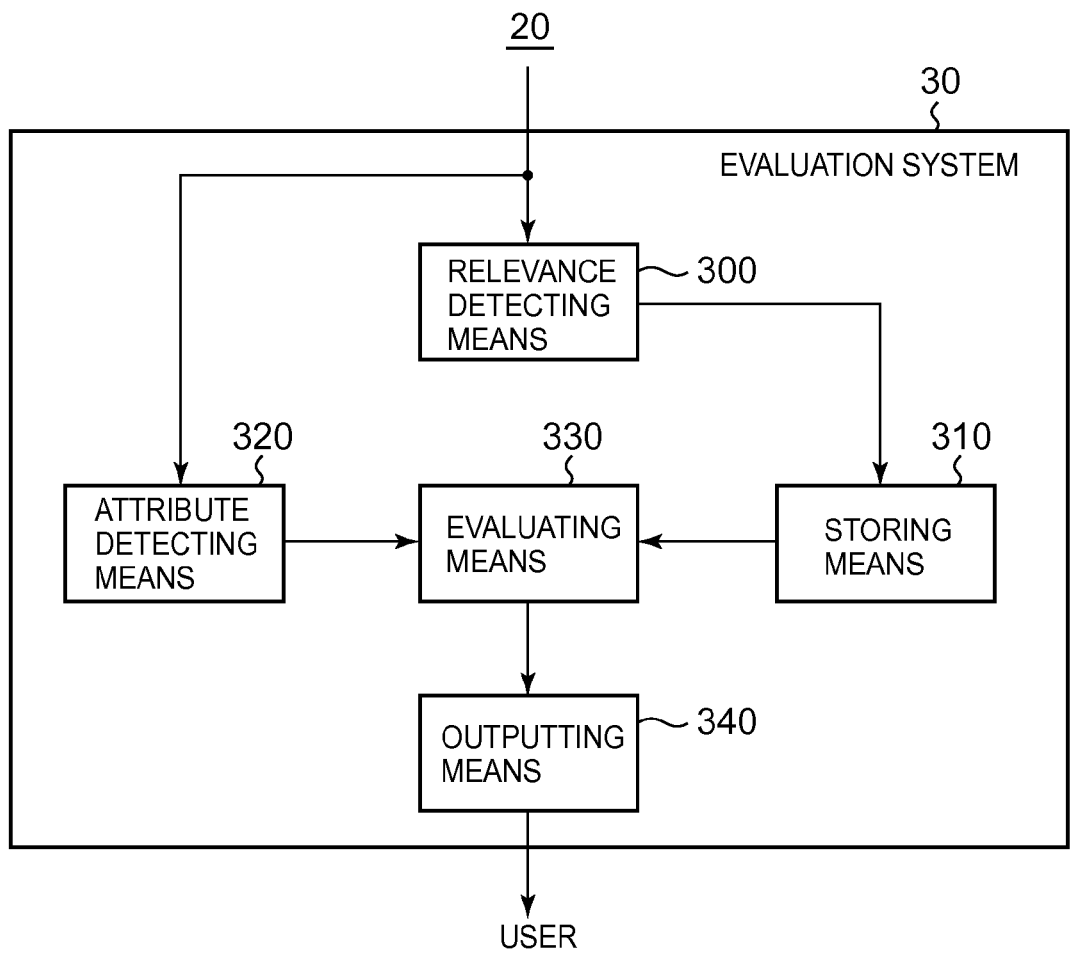
FIG. 3 shows a functional configuration of an evaluation system 30.
FIG. 4 shows an example of a data structure of a storing means 310.

FIG. 3 shows a functional configuration of the evaluation system 30. The evaluation system 30 includes relevance detecting means 300, storing means 310, attribute detecting means 320, evaluating means 330 and outputting means 340. The relevance detecting means 300 detects directed relevance of a person to another person and/or undirected relevance based on the texts stored in the text database 20. More specifically, the relevance detecting means 300 detects person's names from the texts. Then, for every person of the detected person's names, the relevance detecting means 300 detects another person who appears along with the former person in the same text. Then, the relevance detecting means 300 detects an expression indicating such relevance in the text in which the names are found.

Firstly, this expression is evaluations or feelings of a person as a target to another person. For example, expressions of feelings may be "like", "trust", "respect", "appreciate", "obliged to", and the like. Also, expressions of evaluations can be not only general evaluations such as "be good at one's job" or "good personality" but also evaluations concerning specific information, such as "familiar with scientific technology", "familiar with the stock market" and the like. In this case, the relevance detecting means 300 can detect evaluations associated with a specific field.

When the expression of evaluations or feelings of a person as a target by another person is detected, then the relevance detecting means 300 determines that directed relevance from the person to the another person exists. That is, for example, when the expression that a person A respects a person B is detected, the relevance detecting means 30 determines that directive relevance from the person A to the person B exists. As the above-mentioned data showing the directed relevance, the relevance detection means 300 may create a directed graph in which a person is indicated as a node and relevance is indicated as an edge. An example of this will be explained in FIG. 6.

Also, the relevance detecting means 300 may detects undirected relevance between a person and another person based on a text in which the fact that the person and another person acted together or information that the person and another person share is described. That is, for example, when the expression indicating that a person A and a person B had a talk is detected, the relevance detecting means 30 determines that undirected relevance between the person A and the person B exists. As the above-mentioned data show undirected relevance, the relevance detection means 300 may create an undirected graph in which a person is indicated as a node and relevance is indicated as an edge. The undirected graph can be created by adding an undirected edge to the above mentioned directed graph.

Also, the relevance detecting means 300 may further detect a weight indicating the strength of relevance based on the frequency with which evaluations or feelings are expressed. More specifically, it means that, when evaluations or feelings are frequently expressed in the text database 20, the relevance detecting means 300 evaluates that the relevance based on the expressions or the feelings is strong compared to the case in which the expressions or feelings are not frequently expressed in the text database 20. Also, the relevance detecting means 300 may evaluate a weight indicating the strength of the relevance based on the date when the evaluation or feeling is expressed. More specifically, it means that, if the evaluation or the feeling was expressed recently, the relevance detecting means 300 evaluates the relevance based on the expression as strong compared to the case in which the evaluation or the feeling was expressed a long time ago.

The storing means 310 stores information on the relevance detected by the relevance detecting means 300 and its weight, and provides the information to the evaluating means 300. Also, the storing means 310 stores the relevance between each of the attribute values and each of the other attribute values of a person in advance. For example, an attribute of a person can be an organization to which persons belong. In this case, the attribute value shows identification information such as the name of the organization, and the like. That is, for example, the storing means 310 stores information, as relevance, such as the fact that ABC Company and XYZ Electric Company are competing, the fact that they are in business tieup, and the like. Furthermore, the storing means 310 may store the relevance of the attribute value by associating them with the time at which the relevance is evaluated.

The attribute detecting means 320 detects the attributes described in the text stored in the text database 20, for each of two persons. The evaluating means 330 evaluates the relevance between a first person and a second person to be evaluated, based on the relevance detected by the relevance detecting means 300. More specifically, firstly the evaluating means 330 selects a plurality of relevances which start from the first person and reach the second person, via at least one further person. The plurality of relevances include the relevances which are detected by the relevance detecting means 300 and stored in the storing means 310. The evaluating means 330 evaluates the relevances between the first person and the second person based on the plurality of selected relevances. For example, when the relevances indicate a positive evaluation or feeling, and the relevances are shown as a directed graph, the evaluating means 330 may evaluate the relevance between the first person and the second person based on the plurality of relevances on a path reversely following the directed graph. Also, when the weight of the relevance is detected, the evaluating means 330 may evaluate the relevances further based on the weight of the relevances. Also, the evaluating means 330 may evaluate the relevances of the persons based on the attributes detected for each person and the relevance between these attributes.

Incidentally, instead of relevance between persons described above, the target of evaluation for the evaluating means 330 may be relevance between organizations. More specifically, the relevance detecting means 330 detects directed relevance of an organization as a target to another organization based on a text in which evaluations and feelings of the organization by the another organization. For example, the text includes not only statements, press reports, and the like, released by an organization, but also remarks of the representative of an organization when the organization is a company, and the like. The evaluating means 330 then evaluates, with respect to a set of a first organization and a second organization to be evaluated, relevance between the first organization and the second organization based on a plurality of relevances including the detected relevances and reaching the second organization from the first organization via at least one further organization. Thus, the evaluation system 30 according to the present embodiment can include, as a target of evaluation, not only persons, but also subjects, such as organizations like companies, which can indicate evaluations or feelings in a text.

The outputting means 340 outputs the relevance evaluated by the evaluating means 330. Also, the outputting means 340 performs outputting based on the relevance. For example, the outputting means 340 may output a person on a path reversely following the directed relevances from the first person to the second person, as an introducer, who can introduce the first person to the second person. The path can include undirected relevance. Therefore, it is possible to support sales activity effectively by using personal connections. That is, when a person is hoping to sell goods or services to a person A, it is possible to advance sales activity smoothly by selecting a person B, as an introducer, whom the person A trusts.

FIG. 4 shows an example of a data structure of the storing means 310. Also, the storing means 310 stores the relevance between each of the attribute values and each of another attribute values in advance. For example, the storing means 310 stores 0.5 as the weight of relevance regarding the set of ABC Company, which is a first attribute value, and XYZ Electric Company, which is a second attribute value. If this relevance shows a friendship between companies, it is considered that there is a good friendship between ABC Company and XYZ Electric Company to a certain degree as the weight of +0.5 is a positive value. Also, the storing means 310 stores the relevance of the attribute values by associating them with the time when the relevance was evaluated. For example, the example of FIG. 4 shows that the relevance between ABC Company and XYZ Electric Company was evaluated on 25 of Apr. 2005. The date of the evaluation may be the date when the information about the relevance is inputted into the storing means 310, or the date when the text about the relevance is created.

Figure 5:
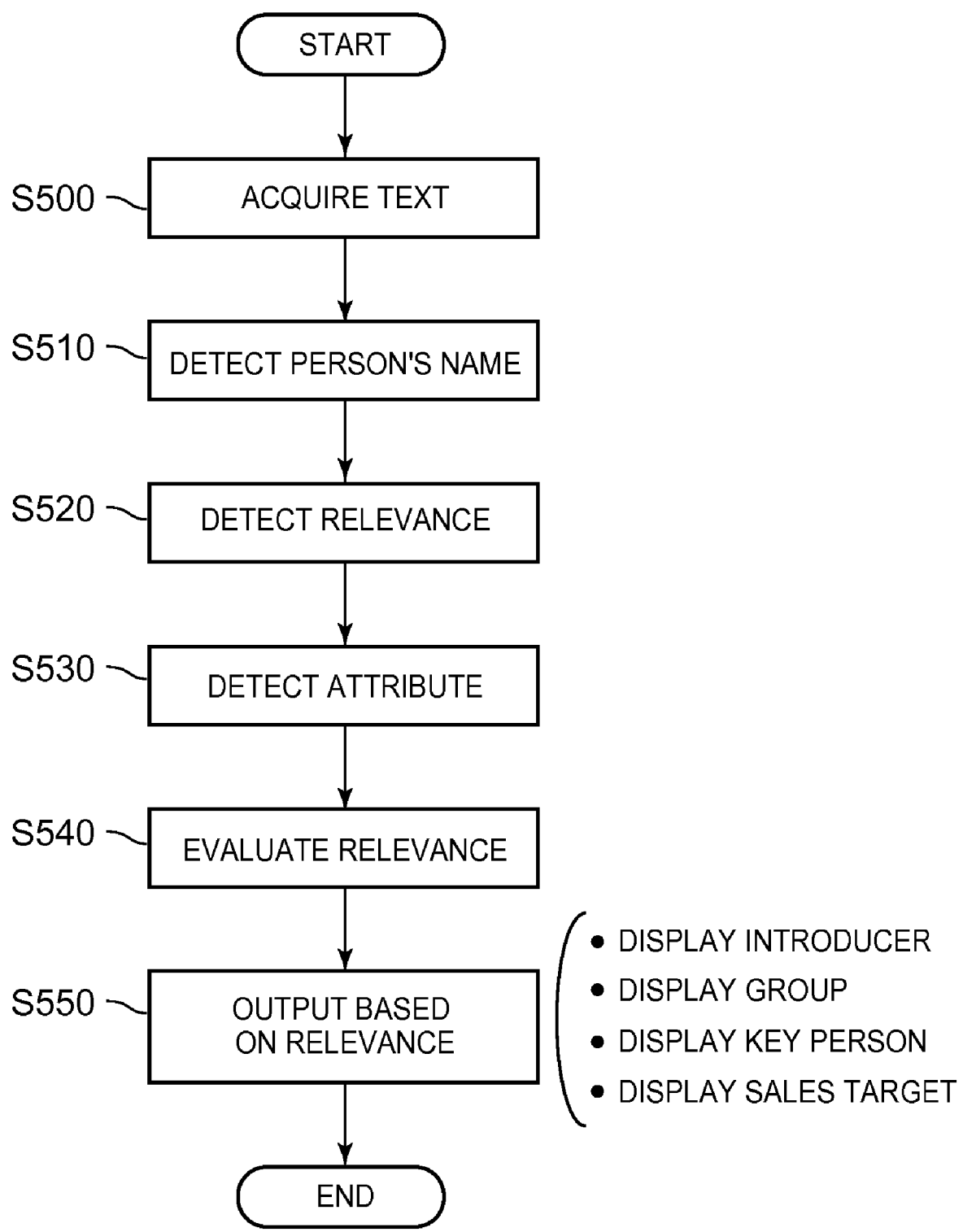
FIG. 5 shows an example of a process for evaluating relevance between persons by the evaluation system 30.

FIG. 5 shows an example of a process for evaluating the relevance between persons by the evaluation system 30. The relevance detecting means 300 acquires a text from the text database 20 (S500). The relevance detecting means 300 detects person's names in the acquired text (S510). For every person of the detected person's names, the relevance detecting means 300 detects another person who appears along with the former person in the same text, and further detects expressions indicating the relevance between two persons (S520). Then, the relevance detecting means 300 detects directed relevance and/or undirected relevance from the person to the other person by using these expressions. The attribute detecting means 320 detects the attributes included in the text stored in the text database 20 for each person (S530).

Figure 6:
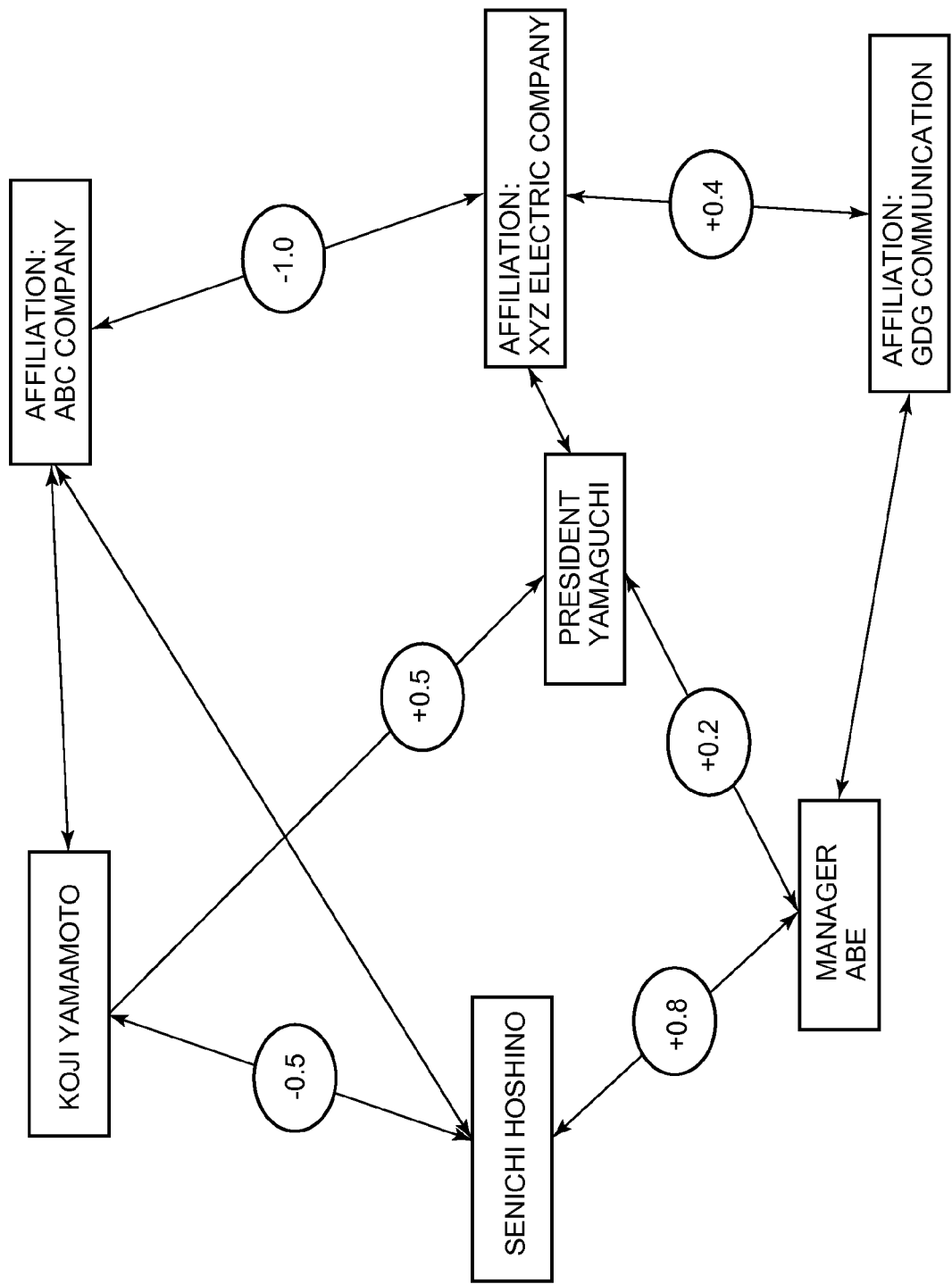
FIG. 6 shows an example of an evaluated relevance by the evaluation system 30.

The evaluating means 330 evaluates, with respect to a set of a first person and a second person to be evaluated, relevance between the first person and the second person based on the information detected by the relevance detecting means 300 (S540). An example of evaluated relevance will be explained with reference to FIG. 6. FIG. 6 shows an example of relevance evaluated by the evaluation system 30. In FIG. 6, each rectangular area indicates a node showing a person, an edge having an arrow at one end only indicates a directed edge, and an edge having arrows at opposite ends indicates an undirected edge.

For example, firstly, the evaluating means 330 selects a plurality of relevances which start from Manager Abe and reach Koji Yamamoto via at least one further person. For example, the evaluating means 330 selects a positive relevance with a weight of 0.2 and a positive relevance with a weight of 0.5, in a path from Manager Abe to Koji Yamamoto via President Yamaguchi. On the other hand, the evaluating means 330 selects a positive relevance with a weight 0.8 and a negative relevance with a weight of 0.5, in a path from Manager Abe to Koji Yamamoto via Senichi Hoshino. These selected relevances include relevances detected by the relevance detecting means 300. That is, for example, the directed relevance from Koji Yamamoto to President Yamaguchi may be detected as a result of a text including expressions of positive feelings or evaluations from Koji Yamamoto toward President Yamaguchi being detected.

Next, the evaluating means 330 evaluates the relevance between Manager Abe and Koji Yamamoto based on these selected relevances. More specifically, the evaluating means 330 may evaluate the total values or the average values of these relevances as the values of the relevance between Manager Abe and Koji Yamamoto. That is, the evaluating means 330 may evaluate the path of the relevance via President Yamaguchi as 0.7, which is calculated by 0.5+0.2, and the path of the relevance via Senichi Hoshino as 0.3, which is calculated by 0.8+(−0.5). According to the evaluated relevance, it is preferable for Manager Abe to contact Koji Yamamoto via President Yamaguchi, rather than via Senichi Hoshino, for the sales strategy.

Also, the evaluating means 330 may select a plurality of relevances including relevances between attribute values, in paths which start from Manager Abe via its attribute value and reaches an attribute of Koji Yamamoto. For example, the evaluating means 330 selects the relevance path which starts from GDG Communication, which is an affiliation organization of Manager Abe, and reaches ABC Company, which is an affiliation organization of Koji Yamamoto. That is, the evaluating means 330 selects the positive relevance path with a weight of 0.4 in the relevance between GDG Communication and XYZ Electric Company, and a negative relevance path with a weight of 1.0 between XYZ Electric Company and ABC Company. Then the evaluating means 330 may evaluate the total value of the weights (that is −0.6) as the evaluation of the relevance between Manager Abe and Koji Yamamoto. Thus, the evaluating means 330 may evaluate the relevance between the attribute values of a first person and a second person more highly when the weight of the relevance is large, compared to the case in which the value of the weight of the relevance between the first person and the second person is small.

In the above described process, the weights of a plurality of different relevances may be evaluated for a set of common persons. For example, as to the weight of the relevance between Koji Yamamoto and Manager Abe via President Yamaguchi, evaluations are +0.7 based on the personal relevance, and −0.6 based on the affiliation relevance. In this case, for example, the evaluating means 330 may select the smaller value of the weight as the result of the evaluation of the relevance. Thereby, it is possible to eliminate a risk of failing in sales activity by using the information about the relevance carefully.

Also, when evaluating the relevance by using attribute values, it is desirable to use the time of evaluation and the property of the evaluation. For example, when the relevance between the attribute of a first person and the attribute of a second person was evaluated recently, the evaluating means 330 may evaluate the relevance between the first person and the second person more highly, compared to the case in which the time of the evaluation is old. The time of the evaluation can be obtained from the information stored in the storing means 310 shown in FIG. 4. Also, when the attribute shows the organization to which they belong, the evaluating means 330 may evaluate more highly if the size of the organization is large, compared to the case in which the organization is smaller. The size of the organization is obtained from the number of links between the attribute values of the organization and the nodes indicating persons.

According to the above-mentioned example, it is possible to evaluate the weight of the relevance between one attribute value and another attribute value based not only on a text but also on the property of each attribute.

The outputting means 340 performs outputting based on the relevance evaluated by the evaluating means 330 (S550). Hereinafter, four applied examples will be explained with reference to the example of FIG. 6.

Display of Introducer

The outputting means 340 outputs an introducer for introducing a salesman to a certain person based on the relevance. Generally, in order to effectively conduct this kind of sales activity, it is important to select an introducer who is trusted by the person. The outputting means 340 can select such an introducer based on the relevance evaluated by the evaluating means 330.

More specifically, firstly, it is supposed that the evaluating means 330 evaluates directed relevance which shows a positive evaluation or feeling from the person toward another person. For example, in the example of FIG. 6, it is detected that Koji Yamamoto has a positive evaluations or feelings toward President Yamaguchi. Then, with respect to relevances from a first person (Manager Abe) to a second person (Koji Yamamoto), the evaluating means 330 reversely follows the directed relevance or follows the undirected relevance, and selects a person on the path reached. The evaluating means 330 then evaluates the selected person as an introducer, who can introduce the first person to the second person. That is, in this example, Senichi Hoshino and President Yamaguchi are evaluated as introducers. The outputting means 340 outputs the information indicating these introducers. Preferably, the outputting means 340 outputs the introducers in descending order of the weights of paths, where the introducers appear. For example, the outputting means 340 may display President Yamaguchi, whose total relevance value is 0.7, more conspicuously than Senichi Hoshino, whose total relevance value is 0.3, or the outputting means 340 may display only President Yamaguchi.

(2) Display of group: The evaluating means 330 may detect a group constituted by a plurality of persons who have strong connections with each other, and the outputting means 340 may display the detected group to a user. More specifically, in a graph setting each person as a node and each relevance as an edge, the evaluating means 330 may detect the plurality of persons who have strong connections with each other as a group, by detecting strong-connection elements, deeming the weight of the relevance as the weight of an edge. In this case, the weight of undirected relevance between a person and another person is assigned to the weight of directed relevance from the person to another person, and the weight of the directed relevance from another person to the person. This allows the existing technique for detecting strong-connection elements from a directed graph with weights to be applicable, and it is possible to properly detect a plurality of persons whose relevance is strong with each other.

(3) Display of a key person: When the relevance indicates a positive evaluation or feeling from one person toward another person, the evaluating means 330 calculates, for example, a total value or an average value, which are values based on the weight of the relevance from the another person to the person. Then, the evaluating means 330 evaluates the one person as a key person in the relevance of persons if a value based on the total value of all relevances to that person is larger than a predetermined reference value. Thereby, it is possible to properly evaluate a person who is trusted and highly evaluated by many persons.

(4) Sales promotion of goods, etc.: If information on the history of purchasing goods can be obtained as attribute information of one person, it can be seen that it is effective to use the historical information for the sales promotion of goods, and the like, by combining the historical information with the relevance between persons. More specifically, the outputting means 340 outputs information that goods or services purchased by one person in the group detected in the example (2) should be recommended to the other persons in the same group.

In addition to this, it is determined that the same kind of goods or services purchased by one person in the group may be recommended to other persons in the same group. More specifically, for example, the goods or services of the same kind are associated with particular goods or the services, and stored in the storing means 310 or the like. Then, the outputting means 340 selects goods or services of the same kind as the goods or services purchased by one person in the group based on the information stored in the storing means 310, or the like. Then, the outputting means 340 outputs information that the goods or services should be recommended to the other persons in the group. Thus, by making use of the relevance between persons for sales activity, persons who have never been considered as potential customers can be discovered as promising targets for sales.

Figure 7:
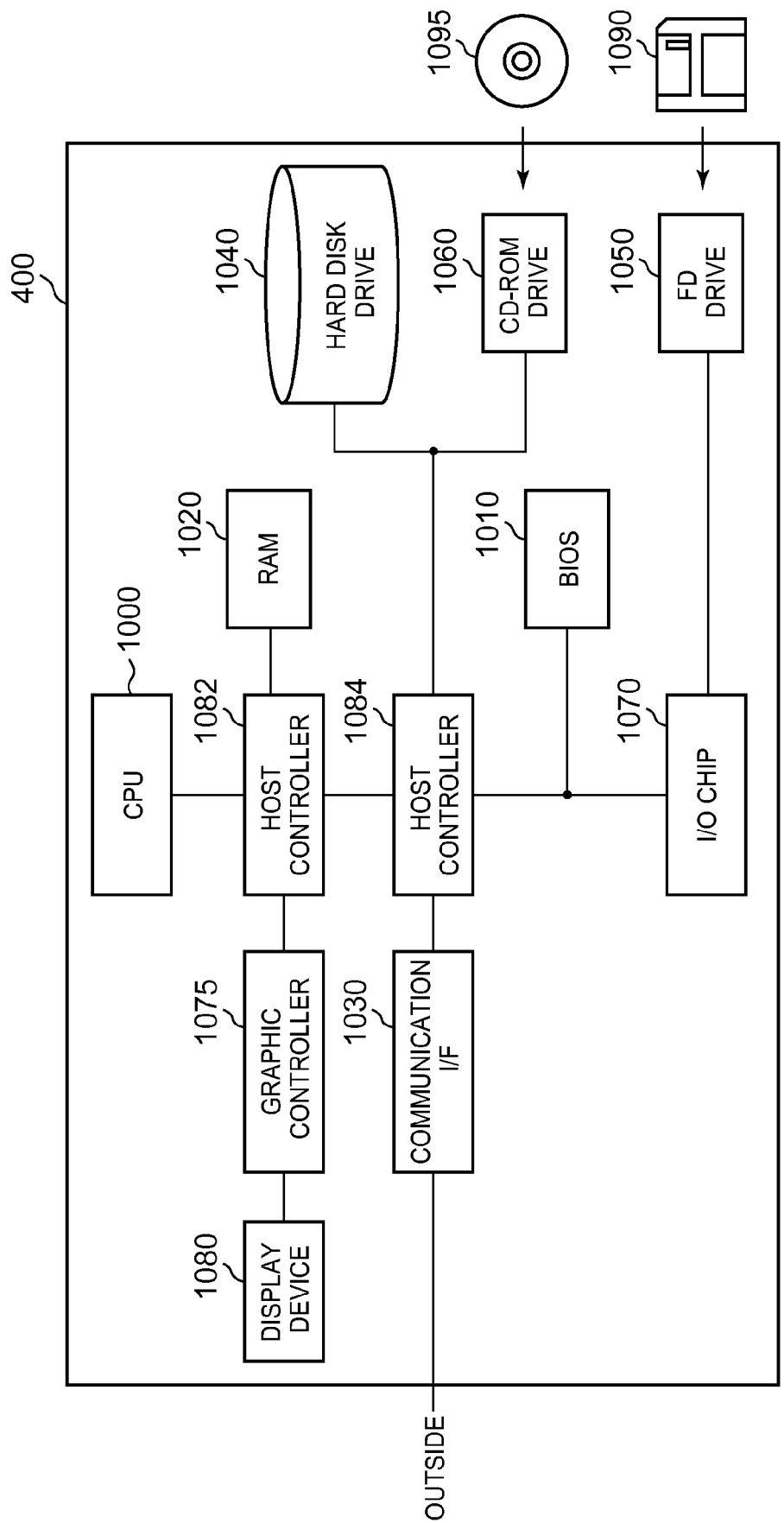
FIG. 7 shows an example of a hardware configuration of an information processing apparatus 400 which serves as the evaluation system 30.

FIG. 7 shows an example of a hardware configuration of an information processing apparatus 400 which serves as the evaluation system 30. The information processing apparatus 400 includes; a CPU peripheral portion having CPU 1000, a RAM 1020 and a graphic controller 1075 mutually connected via a host controller 1082; an input/output portion having a communication interface 1030, a hard disk drive 1040, and a CD-ROM drive 1060 connected to the host controller 1082 via an input/output controller 1084; and a legacy input-output portion having a BIOS 1010, a floppy disk drive 1050, and an input/output chip 1070 connected to the input/output controller 1084.

The host controller 1082 connects the RAM 1020 to the graphic controller 1075 and the CPU 1000 which access the RAM 1020 with a high transfer rate. The CPU 1000 operates based on a program stored in the BIOS 1010 and the RAM 1020, and controls each part. The graphic controller 1075 acquires image data generated on a frame buffer provided on the RAM 1020 by the CPU 1000 and the like, and displays it on the display apparatus 1080. Alternately, the graphic controller 1075 may include the frame buffer which stores the graphic data generated by the CPU 1000 and the like.

The input/output controller 1084 connects the host controller 1082 to the communication interface 1030, the hard disk drive 1040, and the CD-ROM drive 1060 which are relatively high-speed input/output apparatuses. The communication interface 1030 communicates with external apparatuses via a network. The hard disk drive 1040 stores a program and data used by the information processing apparatus 400. The CD-ROM drive 1060 reads out programs or data from a CD-ROM 1095, and offers it to the RAM 1020 or the hard disk drive 1040.

Also, the input/output controller 1084 is connected to relatively low-speed input/output apparatuses such as the BIOS 1010, the floppy disk drive 1050, the input/output chip 1070, and the like. The BIOS 1010 stores a boot program performed by the CPU 1000 during start of up the information processing apparatus 400, a program depending on the hardware of the information processing apparatus 400, and the like. The floppy disk drive 1050 reads out a program or data from a floppy disk 1090, and offers it to the RAM 1020 or the hard disk drive 1040 via the input/output chip 1070. The input/output chip 1070 connects various input/output apparatuses via the floppy disk 1090, or interfaces such as a parallel port, serial port, keyboard port, mouse port, and the like.

A program provided to the information processing apparatus 400 is stored in a recording medium such as the floppy disk 1090, a CD-ROM 1095, an IC card, or the like, and provided by the user. The program is read out from the recording medium via the input/output chip 1070 and/or the input/output controller 1084, installed on the information processing apparatus 400 to be performed. The operation of the information processing apparatus 400 caused by the program is the same as the operations of the evaluation system 30 described in FIG. 1 to FIG. 6, and thus the explanation is omitted.

The program described above may be stored in an external storage medium. As the storage medium, not only the floppy disk 1090, the CD-ROM 1095, but also an optical recording medium such as a DVD, a PD, and the like, and a semiconductor memory such as a tape medium, an IC card, and the like, may be used. Also, a storage apparatus such as a hard disk or RAM provided in a server system connected to a dedicated communication network or the internet may be used as a recording medium in order to provide to a program to the information processing apparatus 400 via a network.

Since the present invention is explained by using the embodiment described above, it should be noted here that the technical scope of the present invention is not limited to the above embodiment. For those skilled in the art, it is assumed that the various modifications and improvements may be included in the above embodiments. Also, from the scope of the claims, it is also assumed that those alternation and improvements to the embodiment of the invention may be included in the technical scope of the present invention.

The invention claimed is:

1. An information processing apparatus for evaluating relevances between persons, the apparatus comprising:
a memory that stores inputted names of a first person and a third person in a text database;
and a processor configured to:
detect a plurality of relevances between said first person and two or more second persons, and between said two or more second persons and said third person, in said text database,
wherein said third person represents a target person, who is to be introduced to said first person by one of said two or more second persons,
wherein said first person and said third person are detected by their names, which are input to said computer, and said two or more second persons are detected as names in said text database,
wherein said plurality of relevances comprises at least one directed relevance and at least one undirected relevance between said third person and said two or more second persons,
wherein said at least one directed relevance comprises:
one of a positive and a negative directed relevance corresponding to positive and negative feelings, respectively, as expressed in said text database; and
a weight of said one of a positive and negative directed relevance is determined by at least one of a value based on a frequency of occurrence of said one of a positive and a negative feelings as expressed in said text database, and a value based on a period of time from said one of a positive and a negative feelings as expressed in said text database to a current time; and
wherein said at least one undirected relevance comprises:
one of a positive and a negative undirected relevance corresponding to one of a positive and a negative acting together, respectively, as expressed in said text database; and
a weight of said one of a positive and negative undirected relevance is determined by at least one of a value based on a frequency of occurrence of said acting together as expressed in said text database, and a value based on a period of time from said acting together as expressed in said text database to a current time;
evaluate each of said plurality of relevances between said first person and said two or more second persons, and between said two or more second persons and said third person, to determine a maximal sum of weights comprising relevances linking said first person to one of said two or more second persons, and linking said one of said two or more persons to said third person; and
output said name of said second person corresponding to said one of said two or more second persons, as an introducer of said first person to said third person.

2. The apparatus according to claim 1, wherein positive feelings of said positive directed relevance include liking, trusting, respecting, appreciating, obliged to, and negative feelings of said negative directed relevance include competing with.

3. A computer-implemented method for evaluating relevances between persons, said method comprising:
detecting, by a computer, a plurality of relevances between a first person and two or more second persons, and between said two or more second persons and a third person, in a text database,
wherein said third person represents a target person, who is to be introduced to said first person by one of said two or more second persons,
wherein said first person and said third person are detected by their names, which are input to said computer, and said two or more second persons are detected as names in said text database,
wherein said plurality of relevances comprises at least one directed relevance and at least one undirected relevance between said third person and said two or more second persons,
wherein said at least one directed relevance comprises:
one of a positive and a negative directed relevance corresponding to positive and negative feelings, respectively, as expressed in said text database; and
a weight of said one of a positive and negative directed relevance is determined by at least one of a value based on a frequency of occurrence of said one of a positive and a negative feelings as expressed in said text database, and a value based on a period of time from said one of a positive and a negative feelings as expressed in said text database to a current time; and
wherein said at least one undirected relevance comprises:
one of a positive and a negative undirected relevance corresponding to one of a positive and a negative undirected relevance acting together, respectively, as expressed in said text database: and a weight of said one of a positive and negative undirected relevance is determined by at least one of a value based on a frequency of occurrence of said acting together as expressed in said text database, and a value based on a period of time from said acting together as expressed in said text database to a current time;

evaluating, by said computer, each of said plurality of relevances between said first person and said two or more second persons, and between said two or more second persons and said third person, to determine a maximal sum of weights comprising relevances linking said first person to one of said two or more second persons, and linking said one of said two or more persons to said third person; and outputting, by said computer, said name of said second person corresponding to said one of said two or more second persons, as an introducer of said first person to said third person.

4. The method according to claim 3, wherein positive feelings of said positive directed relevance include liking, trusting, respecting, appreciating, obliged to, and negative feelings of said negative directed relevance include competing with.

5. A computer program product readable by a computer, tangibly embodying a program of instructions executable by said computer to perform a method for evaluating relevances between persons, said method comprising:

detecting a plurality of relevances between a first person and two or more second persons, and between said two or more second persons and a third person, in a text database, wherein said third person represents a target person, who is to be introduced to said first person by one of said two or more second persons, wherein said first person and said third person are detected by their names, which are input to said computer, and said two or more second persons are detected as names in said text database, wherein said plurality of relevances comprises at least one directed relevance and at least one undirected relevance between said third person and said two or more second persons, wherein said at least one directed relevance comprises:

one of a positive and a negative directed relevance corresponding to positive and negative feelings, respectively, as expressed in said text database; and a weight of said one of a positive and negative directed relevance is determined by at least one of a value based on a frequency of occurrence of said one of a positive and a negative feelings as expressed in said text database, and a value based on a period of time from said one of a positive and a negative feelings as expressed in said text database to a current time; and wherein said at least one undirected relevance comprises:

one of a positive and a negative undirected relevance corresponding to one of a positive and a negative acting together, respectively, as expressed in said text database; and a weight of said one of a positive and negative undirected relevance is determined by at least one of a value based on a frequency of occurrence of said acting together as expressed in said text database, and a value based on a period of time from said acting together as expressed in said text database to a current time;

evaluating each of said plurality of relevances between said first person and said two or more second persons, and between said two or more second persons and said third person, to determine a maximal sum of weights comprising relevances linking said first person to one of said two or more second persons, and linking said one of said two or more persons to said third person; and outputting said name of said second person corresponding to said one of said two or more second persons, as an introducer of said first person to said third person.

6. The computer program product according to claim 5, wherein positive feelings of said positive directed relevance include liking, trusting, respecting, appreciating, obliged to, and negative feelings of said negative directed relevance include competing with.

* * * * *